United States Patent [19]
Oldenburg

[11] 3,996,982
[45] Dec. 14, 1976

[54] SHEAR ASSEMBLY FOR TREE HARVESTER
[75] Inventor: Dorrance Oldenburg, Yorkville, Ill.
[73] Assignee: Caterpillar Tractor Co., Peoria, Ill.
[22] Filed: Dec. 22, 1975
[21] Appl. No.: 642,963
[52] U.S. Cl. .............................. 144/34 E; 144/3 D; 144/309 AC
[51] Int. Cl.² ........................................ A01G 23/08
[58] Field of Search ................ 144/2 Z, 3 D, 34 R, 144/34 E, 309 AC

[56] References Cited
UNITED STATES PATENTS
3,643,712  2/1972  Doel et al. ..................... 144/34 E
3,727,653  4/1973  Tucek ............................ 144/34 E Primary Examiner—Othell M. Simpson
Assistant Examiner—W. D. Bray
Attorney, Agent, or Firm—Wegner, Stellman, McCord, Wiles & Wood

[57] ABSTRACT

A shear assembly suitable for use with a tree harvesting machine including a shear support frame, a pair of blade arm assemblies, each carrying a shear blade, a hydraulic motor connected between the shear frame and each of the blade arm assemblies for opening and closing the shear assembly, and hydraulic lines leading to the hydraulic motors routed internally within the shear assembly to protect the hydraulic lines from possible damage.

6 Claims, 2 Drawing Figures

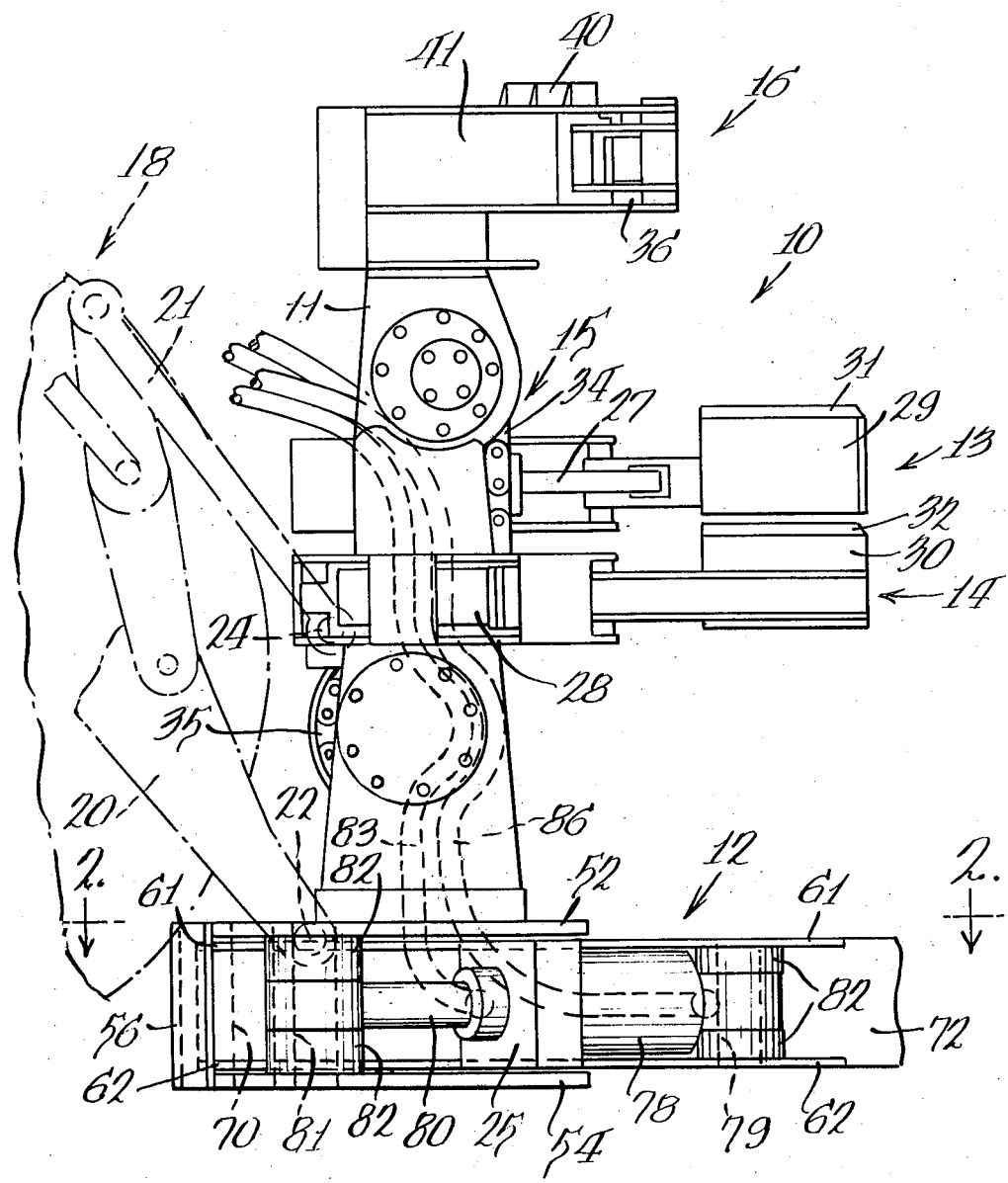

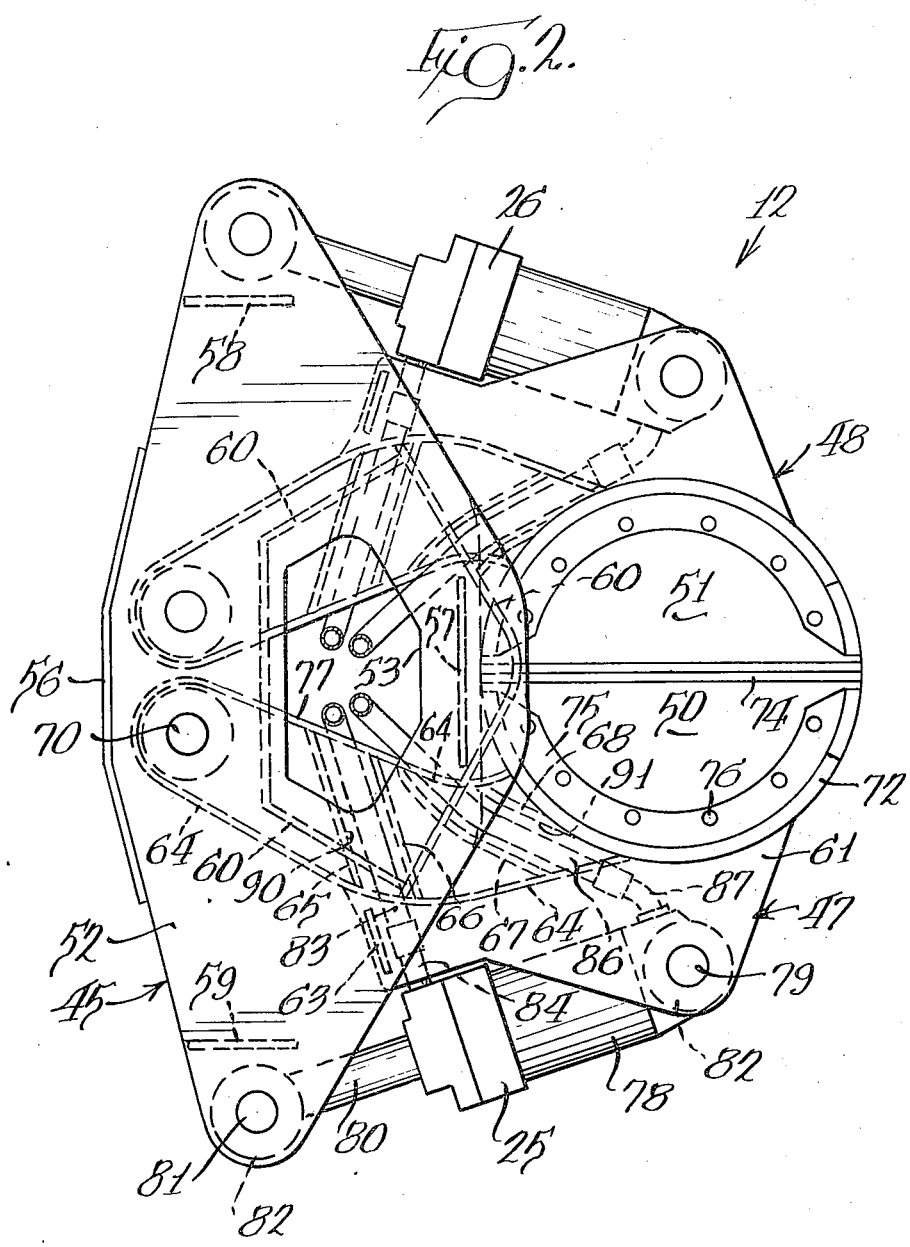

SHEAR ASSEMBLY FOR TREE HARVESTER

BACKGROUND OF THE INVENTION

The present invention relates generally to a tree harvesting machine attachable to a vehicle, and more particularly, to a hydraulically controlled shear assembly utilized with such a tree harvesting machine.

The present invention concerns a tree harvesting machine generally shown and described in Moser et al U.S. Pat. No. 3,842,872 entitled "Delimber Assembly For Tree Harvesting Machines", issued Oct. 22, 1972, and Gutman et al U.S. Pat. No. 3,669,161 entitled "Drive Mechanism For Tree Harvesters", issued June 13, 1972. Both of the above are assigned to the assignee of the present invention.

A shear assembly is employed with a tree harvesting machine to sever trees from the ground. Typically, the shear assembly is situated at the lower end of the harvester head so that a tree may be cut at its base. The shear assembly is actuated by hydraulic jacks having flexible hydraulic lines leading therefrom to a source of fluid under pressure and a control circuit disposed on the vehicle carrying the harvester head.

Because the shear assembly is employed near the ground, in prior art constructions the hydraulic lines may be pinched or severed when trapped between the ground and a portion of the harvester head or struck by tree parts or the like. The hydraulic lines may also be severed if they are caught between the movable portions of the shear assembly when the shear assembly is closed. Because the hydraulic lines are connected to moving parts, they cannot be suitably reinforced since they must be capable of flexing in response to the movements of the hydraulic jacks. In addition, the hydraulic lines, if unprotected, may be damaged by debris packing or freezing around the lines during inactive periods and during subsequent startup.

SUMMARY OF THE INVENTION

It is, therefore, the principal object of the present invention to provide a shear assembly wherein the hydraulic lines are protected from damage. More specifically, it is an object of the present invention to provide a shear assembly which has hydraulic lines mounted internally within the shear assembly structure so that the lines are substantially unexposed and unaffected by packed or frozen debris.

In accordance with the present invention, a shear assembly includes a shear support frame having upper and lower spaced plates, a pair of blade arm assemblies pivotally mounted between the shear frame plates for swinging motion and hydraulic jacks connected between the shear frame and the blade arm assemblies. Hydraulic lines for the jacks extend internally within the blade arm assemblies and between the shear frame plates. Thus, the shear assembly parts additionally serve to protect the hydraulic lines from damage.

In an exemplary embodiment of the present invention, vertically extending crosspieces are secured between the shear frame plates to maintain the shear frame plates in spaced relationship and to provide rigidity. The blade arm assemblies also have upper and lower spaced plates with crosspieces which are disposed between the blade arm assembly plates to provide rigidity. The blade arm assembly crosspieces define guide passages for the hydraulic lines to provide additional protection and maintain the hydraulic lines in substantially fixed position relative to the shear assembly.

A feature of the present invention is the path of the hydraulic lines from the shear assembly through the interior of the tubular harvester head frame to an exit position well away from the activity zone of the shear and the hazards created by the nearness of the ground and the operation of the tree harvesting machine itself.

In the preferred embodiment of the present invention, the cylinders of the hydraulic jacks are pivotally secured to the movable blade arm assemblies and the pistons are pivotally secured to the shear frame. Because the cylinders move along with the blade arm assemblies, the hydraulic lines remain in substantially fixed relation between the cylinders and the guide passages so that the lines are not subjected to contortive flexing as the shear assembly is operated. In addition, the cylinders are arranged externally of the blade arm assemblies with the hydraulic lines extending internally so that the cylinder protects the hydraulic lines as they emerge from the cylinders.

Further features and advantages of the present invention will readily be apparent from the following specification taken in conjunction with the accompanying drawings.

BRIEF DESCRIPTION OF THE DRAWINGS

FIG. 1 is a side elevational view of a tree harvesting machine employing the present invention and illustrating a fragmentary portion of a vehicle on which a harvester head is mounted; and FIG. 2 is a view taken along line 2—2 of FIG. 1.

DESCRIPTION OF THE PREFERRED EMBODIMENT

Referring to FIG. 1, a tree harvesting machine constructed according to the present invention includes a harvester head or attachment 10 having an elongate, tubular frame 11 along which a shear assembly 12, a pair of grapple arms 13 and 14, a drive mechanism, generally designated 15, and a delimber assembly 16 are arranged.

The harvester head frame 11 is movably mounted on a vehicle 18 (partially shown). The vehicle 18 is a generally conventional loader vehicle of the type commonly adapted for use with a loader bucket and having a pair of lift arms, one of which is designated 20, and a tilt linkage 21. The harvester head frame 11 is interconnected with the lift arms 20 and the tilt linkage 21 by pivot connections indicated at 22 and 24, respectively.

The shear assembly 12, best seen in FIG. 2, is mounted upon the lower end of the harvester head frame 11 and includes means for cutting trees placed within the harvester head 10 and severing them from the ground. Double acting hydraulic jacks 25 and 26 are operable in extension to close the shear assembly 12 to cut through the trunk of a tree placed in the harvester head 10. Retraction of the jacks 25 and 26 serves to reopen the shear assembly 12. Additional details of the shear assembly constructed according to the present invention will be described in more detail hereinafter.

The grapple arms 13 and 14 are pivotally supported upon the harvester head frame 11 and operable by double acting hydraulic jacks 27 and 28, respectively, for urging a tree into engagement with the drive mechanism 15. At the end of each of the grapple arms 13 and 14 are arcuate impact shearing blades 29 and 30, respectively, having cutting edges 31 and 32 extending generally away from the direction of tree movement produced by the drive mechanism 15 to cut off limbs generally facing away from the harvester head frame 11. Each of the jacks 27 and 28 are interconnected between the harvester head frame 11 and its respective grapple arm. The jacks 27 and 28 are operable in extension for closing the grapple arms 13 and 14 against a tree and for urging them into engagement with the drive mechanism 15. The jacks 27 and 28 are retractable for opening the grapple arms 13 and 14 and releasing the tree from the harvester head 10. The jacks 27 and 28 tend to act resiliently upon the grapple arms 13 and 14 during the processing operation so that the grapple arm blades 29 and 30 are constantly urged into engagement with the tree and so that the tree is also urged into engagement with the delimber assembly 16 and with the drive mechanism 15. To prevent interference between the grapple arm blades 29 and 30 and the delimber assembly 16, the grapple arms 13 and 14 are axially offset along the harvester head frame 11 relative to the delimber assembly 16 and to each other.

The drive mechanism 15 is arranged on a midportion of the harvester head frame 11. Generally, the drive mechanism 15 is formed with an endless track or chain assembly 34 arranged for rotation upon harvester head frame 11 by means of rollers and sprockets, one of which is designated 35. A hydraulic rotary drive motor (not shown) is coupled with one of the sprockets for operating the drive mechanism 15. Additional details of the drive mechanism may be found in U.S. Pat. No. 3,669,161 noted above.

The delimber assembly 16 is mounted upon the upper end of the harvester head frame 11. The delimber assembly 16 includes a flexible blade, generally designated 36, composed of pivotally connected chain links having impact cutting edges 40 extending generally away from the direction of tree movement produced by the drive mechanism 15 for delimbing a tree. The flexible blade 36 is supported at each end by brackets, one of which is designated 41. When a tree is positioned between the brackets 41, the blade 36 partially encircles the tree and is urged into engagement against the surface of the tree by tension springs (not shown) acting on the ends of the blade 36 so that the impact cutting edges 40 cut those limbs generally facing the harvester head frame 11. A more detailed description of the delimber assembly may be found in U.S. Pat. No. 3,842,872 referenced previously herein.

The tree harvesting process is commenced by driving the vehicle 18 forwardly so that the harvester head 10, in the upright position as shown in FIG. 1, receives a standing tree within the shear assembly 12, between the grapple arms 13 and 14, against the drive mechanism 15 and within the delimber assembly 16. The grapple arms 13 and 14 are then closed against the tree by extending the grapple arm jacks 27 and 28 so that the tree is maintained within the harvester head 10. The tree is then severed from the ground by extending the shear jacks 25 and 26 to close the shear assembly 12 along the base of the tree.

To initiate the delimbing process, the harvester 10 is rotated forwardly and downwardly by the tilt linkage 21 so that the tree is in a generally horizontal position. The shear assembly 12 is opened by retracting the shear jacks 25 and 26 so that the tree may be urged to move axially within the harvester head 10 toward and through shear assembly 12 by the rotating chain assembly 34 of the drive mechanism 15. When the tree is advanced through the harvester head 10, limbs and other projections are removed by the delimber assembly 16 in conjunction with the grapple arm blades 29 and 30 as the limbs and projections impact the respective cutting edges. During this phase of operation, the grapple arm blades 29 and 30 continue to be urged by the grapple arm jacks 27 and 28 into processing engagement with the circumference of the tree and the grapple arms 13 and 14 continue to urge the tree into proper engagement with the drive mechanism 15 and the flexible blade 36 of the delimber assembly 16.

The grapple arms 13 and 14 remain in closed engagement with the tree during actuation of both the shear assembly 12 and the drive mechanism 15 to prevent the tree from falling from the harvester head 10. The shear assembly 12 may be actuated during the delimbing process to cut the tree into sections or to remove the top portion of the tree. After processing the tree, the grapple arm jacks 27 and 28 are retracted to open the grapple arms 13 and 14 and release the tree.

After completion of the harvesting process, the harvester head 10 is rotated back to an upright position and the grapple arms 13 and 14 and the shear assembly 12 are placed in an open position in order to readily receive another tree.

The shear assembly 12 includes a stationary shear support frame 45 attached to the lower end of the harvester head frame 11 and a pair of blade arm assemblies having blade arms 47 and 48, respectively. Each of the blade arms 47 and 48 carries respective blades 50 and 51 at one end and are pivotally mounted at the other end to swing relative to the shear frame 45. The hydraulic jacks 25 and 26 are interconnected between the shear frame 45 and the respective blade arms 47 and 48 for controlling the swinging motion of the blade arm assemblies.

The shear frame 45 includes an upper plate 52 having an aperture 53, a lower plate 54, and various vertical crosspieces 56, 57, 58 and 59 disposed within the space between the upper plate 52 and the lower plate 54 and secured thereto to maintain the plates 52 and 54 in spaced relation, provide rigidity to the shear frame 45, and protect various components of the shear assembly. The dashed lines at 60 illustrate the position of the harvester head frame 11 and shear frame plate 52 relative to the shear frame 45.

The blade arms 47 and 48 and the respective blades 50 and 51 extend forwardly of the harvester head frame 11. When the blades 50 and 51 are swung to an outward open position by retraction of the jacks 25 and 26, the blades 50 and 51 form a forwardly facing opening for receiving a tree. As illustrated in FIG. 2, the blades 50 and 51 may be swung to an inward closed position by extension of the jacks 25 and 26 so that the cutting edges of the blades 50 and 51 are in parallel and abutting relation for cutting a tree and severing it from the ground.

The blade arm assemblies are similar so that only one need be described in detail. The blade arm 47 is comprised of an upper plate 61, a lower plate 62, and various vertical crosspieces 63, 64, 65, 66, 67 and 68 secured between the plates 61 and 62 and which maintain the plates 61 and 62 in spaced relation, provide rigidity and protect the various components of the shear assembly 12.

The crosspiece 64 is generally U-shaped to conform to the periphery of the blade arm 47. The blade arm 47 is disposed between the shear frame plates 52 and 54 and is pivotally mounted thereto by a pivot pin 70 extending through one end of the blade arm 47 and connected between the plates 52 and 54. The other end of the blade arm 47 carries a vertical arcuate plate 72. The ends of the crosspiece 64 also abut the arcuate plate 72 so that the interior of the blade arm 47 between the plates 61 and 62 is substantially enclosed. The arcuate plate 72 provides a rail for preventing a tree from slipping off the blade 50 after the tree is cut by the closing movement of the blades. The blade 50 has a cutting edge 74 and is secured to a fabricated flange 75 by the bolts 76. The fabricated flange 75 also provides rigidity for the blade 50. This construction allows replacement of the blades by removal of the bolts 76, thereby avoiding the necessity of replacing the entire assembly when the blades become worn.

The blade arm 47 and the blade 50 are arranged such that upon complete closure of the shear assembly as shown in FIG. 2, the concave intermediate portions of the blade arms 47 and 48 form an opening 77 through which the hydraulic lines 83 and 86 may be directed.

The cylinder 78 of the hydraulic jack 25 is pivotally connected between the plates 61 and 62 by a pivot pin 79 and the piston rod 80 of the hydraulic jack 25 is pivotally connected between the plates 52 and 54 by a pivot pin 81 spaced from the blade pivot 70. Large spacing washers 82 maintain the jack 25 in correct vertical position between the plates 52 and 54, and the plates 61 and 62.

In accordance with the present invention, a flexible hydraulic line 83 communicates with the rod end of the cylinder 78 through a fitting 84 and a flexible hydraulic line 86 communicates with the head end of the cylinder 78 through a fitting 87 so that hydraulic fluid for operating the jack 25 may be delivered to and from the cylinder 78. The rod end line 83 extends through a guide passage 90 defined by the crosspieces 65 and 66 to the opening 77 between the intermediate portions of the blade arms 47 and 48 and between the shear frame plates 52 and 54. The head end line 86 extends through a guide passage 91 defined by the crosspieces 67 and 68 to the opening 77. The opening 77 between the blade arms 47 and 48 within the shear frame 45 is protectively enclosed at the bottom by the plate 54, at the rear by the crosspiece 56 carried by the shear frame 45, at the sides and rear by the blade arms 47 and 48, and forwardly by the crosspiece 57. The line 83 and the fitting 84 are also protected rearwardly by the crosspiece 63 carried by the blade arm 47.

Thereafter, both lines 83 and 86 are directed from the opening 77 through the aperture 53 in the upper plate 52 into the interior of the harvester head tubular frame 11. The lines 83 and 86 thereafter exit the harvester head frame 11 at an elevated, convenient intermediate point and are linked to the operator's control circuit disposed on the vehicle 18 which includes a source of fluid under pressure and a fluid reservoir, neither of which is shown.

The blade arm assembly plates 61 and 62 partially cover the cylinder 78 so that the hydraulic lines 83 and 86 and the fittings 84 and 87 lying inwardly of the cylinder 78 are protected top and bottom. The cylinder 78 protects the hydraulic lines 83 and 86 and the fittings 84 and 87 along the edge of the blade arm assembly. By mounting the cylinder 78 of the hydraulic jack 25 to the movable blade arm 47, the cylinder 78 moves in unison with the blade arm 47. Thus, the hydraulic lines 83 and 86 are always in substantially the same orientation relative to the blade arm assembly and the passages defined thereby so that the lines are not subjected to contortive flexing as the shear assembly is operated.

I claim:

1. A shear assembly for a tree harvesting machine comprising:
   a tubular harvester head frame; ,
   a shear support frame attached to said harvester head frame, said shear frame having upper and lower spaced plates;
   a pair of blade arm assemblies, each of said blade arm assemblies being pivotally connected to said shear frame between said shear frame plates and carrying a blade extending from said shear frame, said blade arm assemblies being in spaced relation for swinging motion between an open position for receiving a tree and a closed position for severing a tree;
   hydraulic motor means connected between each of said blade arm assemblies and said shear frame for controlling the swinging motion of said blade arm assemblies; and
   means defining hydraulic line passages extending internally through said blade arm assemblies between said motor means and the interior of said shear frame between said spaced plates, hydraulic lines communicating with said motor means being directed from the interior of said shear frame into the interior of said harvester head frame, whereby hydraulic fluid for operating said motor means is delivered through hydraulic lines extending to and from said motor means internally within said shear assembly and said harvester head frame so that the hydraulic lines are at least partially surrounded and protected.

2. A shear assembly for a tree harvesting machine comprising:
   a tubular harvester head frame;
   a shear support frame attached to said harvester head frame, said shear frame having upper and lower spaced plates;
   a pair of blade arm assemblies, each of said blade arm assemblies being pivotally connected to said shear frame between said shear frame plates and carrying a blade extending from said shear frame, said blade arm assemblies being in spaced relation for swinging motion between an outward open position for receiving a tree between said blades and an inward closed position for severing a tree received therebetween, each of said blade arm assemblies having a hydraulic line passage extending from an outward edge of said blade arm assembly to an inward edge of said blade arm assembly, said blade arm assemblies defining an opening therebetween within said shear frame;
   hydraulic motor means connected between each of said blade arm assemblies and said shear frame for controlling the swinging motion of said blade arm assemblies, said hydraulic motor means being disposed generally along the outward edge of said blade arm assembly in spaced relation from the pivotal connection of said blade arm assembly with said shear frame; and
   hydraulic lines communicating with said hydraulic motor means extending internally through said hydraulic line passages between said hydraulic motor means and said opening within the interior of said shear frame between said spaced plates, said hydraulic lines being directed from the interior of said shear frame into the interior of said harvester head frame whereby hydraulic fluid for operating said motor means is delivered through hydraulic lines extending to and from said motor means internally within said shear assembly and said harvester head frame so that the hydraulic lines are at least partially surrounded and protected.

3. A shear assembly for a tree harvesting machine comprising:
 a shear support frame attached to a tree harvesting machine, said shear frame having upper and lower spaced plates;
 a pair of blade arm assemblies, each of said blade arm assemblies being pivotally connected to said shear frame between said shear frame plates and carrying a blade extending from said shear frame, said blade arm assemblies being in spaced relation for swinging motion between an outward open position for receiving a tree between said blades and an inward closed position for severing a tree received therebetween, each of said blade arm assemblies having upper and lower spaced plates and a plurality of vertically extending crosspieces secured between said blade arm assembly plates, said crosspieces defining pasages beteen said blade arm assembly plates extending from an outward edge of a blade arm assembly to an inward edge of the blade arm assembly;
 hydraulic motor means connected between each of said blade arm assemblies and said shear frame for controlling the swinging motor of said blade arm assemblies, said hydraulic motor means being in spaced relation from the pivotal connection of said blade arm assembly with said shear frame; and
 hydraulic lines communicating with said hydraulic motor means to deliver hydraulic fluid for operating said motor means, said hydraulic lines being routed from said motor means internally through said passages.

4. The shear assembly of claim 3 wherein said hydraulic motor means comprises a double acting hydraulic jack having a cylinder and a piston rod for each of said blade arm assemblies, said piston rod being pivotally connected to said shear frame and said cylinder being pivotally connected to said blade arm assembly whereby said cylinder moves in substantial unison with said blade arm asembly, said cylinder having a head end hydraulic line and a rod end hydraulic line routed through said blade arm assembly so that said hydraulic lines are maintained in substantially the same orientation relative to said blade arm assembly as said blade arm assembly is swung between open and closed positions.

5. The shear assembly of claim 4 wherein said piston rod is pivotally connected to said shear frame between said shear frame plates, said cylinder being pivotally connected to a blade arm assembly between said blade arm assembly plates such that said cylinder is at least partially covered and protected by said blade arm assembly plates, and said cylinder covering the outward edge of said blade arm assembly so that said hydraulic lines which extend through said passages are protected from external damage.

6. A shear assembly suitable for use with a tree harvesting machine having an elongate tubular harvester head frame carried by a vehicle comprising:
 a shear support frame mounted on the harvester head frame, said shear frame having upper and lower spaced plates, one of said plates having an aperture communicating with the interior of the harvester head frame;
 a pair of blade arm assemblies, each of said blade arm assemblies being pivotally connected to said shear frame between said upper and lower plates of said shear frame and carrying a shear blade extending from said shear frame, said blade arm assemblies being in spaced relation for swinging motion beteeen an outward open position for receiving a tree and an inward closed position for severing a tree received therebetween, each of said blade arm assemblies having upper and lower spaced plates;
 a plurality of crosspieces mounted between said upper and lower plates of each of said blade arm assemblies, said crosspieces defining passages extending from an outward edge of said blade arm assemblies to an inward edge of said blade arm assemblies;
 a pair of double acting hydraulic jacks having a cylinder and a piston rod, a hydraulic jack connected between said shear frame and each of said blade arm assemblies, said hydraulic jacks being in spaced relation from the pivotal connections of said blade arm assemblies with said shear frame, each of said hydraulic jacks having its piston rod pivotally connected to said shear frame between said upper and lower plates of said shear frame and having its cylinder pivotally connected to its respective blade arm assembly between said upper and lower plates of said respective blade arm assembly whereby extension of said hydraulic jacks closes said blades and retraction of said hydraulic jacks opens said blades; and
 hydraulic lines communicating with said hydraulic jacks to deliver hydraulic fluid for operating said jacks to and from said cylinders, said hydraulic lines extending from said cylinders internally through said blade arm assemblies between said blade arm assembly plates within said passages, said hydraulic lines being directed from said passages between said upper and lower plates of said shear frame through said aperture into the interior of said tubular harvester head frame so that said hydraulic lines are protected from external damage by the surrounding components of said shear assembly, said hydraulic lines being adaptable for final communication with a source of fluid under pressure and a fluid reservoir.

* * * * *